J. LUNKE.
EGG CARRIER.
APPLICATION FILED MAY 13, 1908.
930,773.
Patented Aug. 10, 1909.
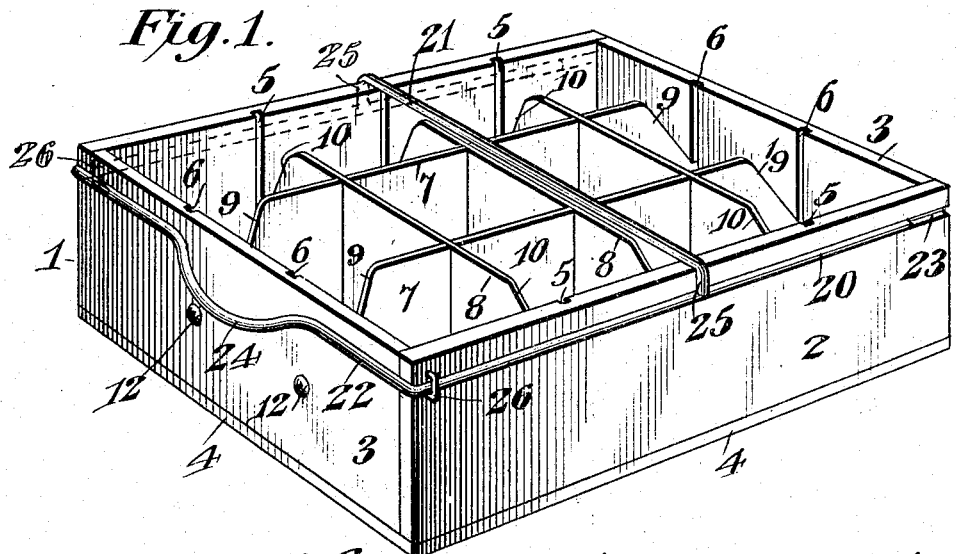
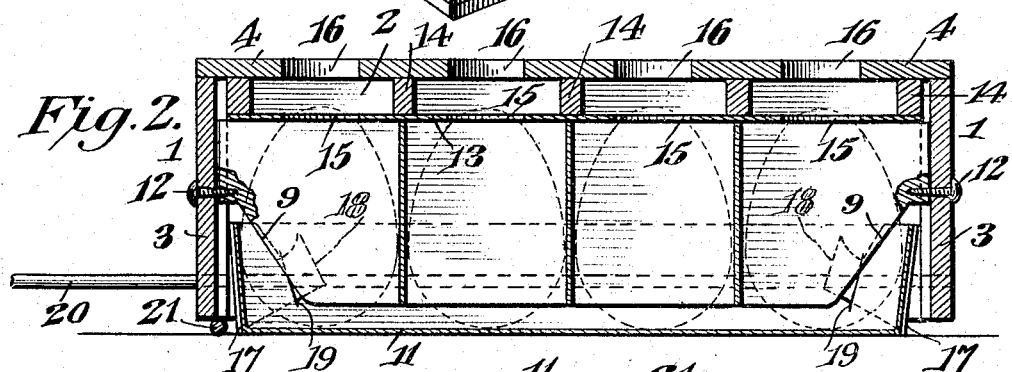
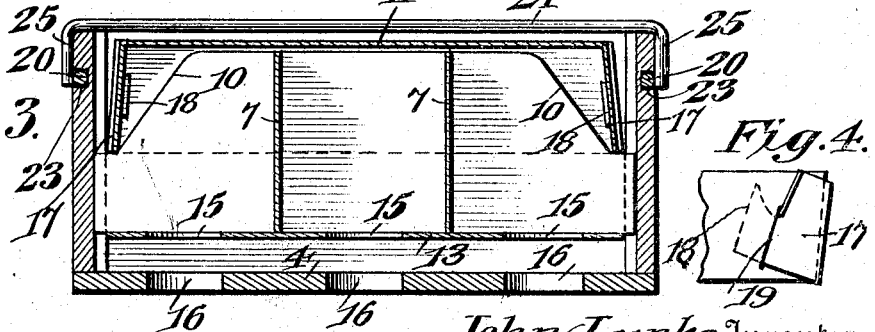
John Lunke, Inventor
Witnesses
By
Attorney

UNITED STATES PATENT OFFICE.

JOHN LUNKE, OF EVERETT, WASHINGTON.

EGG-CARRIER.

No. 930,773.  Specification of Letters Patent.  Patented Aug. 10, 1909.

Application filed May 13, 1908. Serial No. 432,713.

*To all whom it may concern:*

Be it known that I, JOHN LUNKE, a citizen of the United States, residing at Everett, in the county of Snohomish and State of Washington, have invented a new and useful Egg-Carrier, of which the following is a specification.

The invention relates to improvements in egg carriers.

The object of the present invention is to improve the construction of egg carriers, and to provide a simple and inexpensive egg carrier, designed for use by grocers in delivering eggs to customers, and adapted to enable eggs to be readily and quickly transferred from the carrier to a tray without liability of breaking the eggs.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of an egg carrier, constructed in accordance with this invention, the collapsible egg tray cover being removed. Fig. 2 is a longitudinal sectional view, the egg carrier being inverted for transferring the eggs from the carrier to the paper tray. Fig. 3 is a transverse sectional view, the egg carrier being in an upright position. Fig. 4 is a detail view of one of the corners of the collapsible paper tray, illustrating the manner of connecting the sides and end walls thereof.

Like numerals of reference designate corresponding parts in all the figures of the drawing.

1 designates a rectangular case, designed to be constructed of wood, or other suitable material and composed of sides 2, ends 3 and a bottom 4. The egg carrier may be constructed of different sizes, and the case 1, which is constructed of a size to receive a dozen eggs, is provided in its side and end walls with vertical grooves 5 and 6 for the reception of longitudinal and transverse members 7 and 8 of a filler.

The filler is designed to be constructed of paper, or other suitable material and the terminals of the longitudinal and transverse members 7 and 8, which are beveled at their upper sides at 9 and 10 to provide a space for the sides and ends of a collapsible combined paper tray and cover 11, are retained in the grooves 5 and 6 by means of screws 12, piercing the end walls of the casing and engaging the terminals of the longitudinal members of the filler. The filler may be detached by withdrawing the screws 12 from engagement with the longitudinal members of the filler. The filler, which forms pockets or cells for the reception of the eggs, is arranged upon a false bottom 13, constructed of paper, or other suitable material and supported by transverse cleats 14, arranged at intervals and located beneath the transverse members of the filler. The false bottom 13 is provided at the center of the pockets or cells with openings 15, forming seats for the points of the eggs, and the bottom 4 of the case is also provided with openings 16, located directly beneath the openings of the false bottom.

The paper tray, which is collapsible to enable a large number of trays to be compactly stored in a small space, has the terminals of its ends bent inwardly to overlap the terminals of the sides, and the overlapping portions 17 are provided with tongues 18, extending through slots 19 of the sides and having enlarged portions for engaging the interior of the tray. The side and end walls of the tray are adapted to be quickly connected together for use, as will be readily understood.

The tapered upper portion of the filler is adapted to receive the tray in an inverted position, the tray being adapted to form a cover for the egg carrier and being retained in place by a slidable locking spring, composed of spaced sides 20, an intermediate connecting portion 21 and an end connecting portion 22. The sides 20 are arranged in exterior horizontal guide grooves 23, located a short distance below the upper edges of the side walls of the case, and the connecting end portion 22 is arranged at the front end of the case and is provided at the center with an outwardly bowed portion 24, forming a handle or grip and adapted to be readily grasped for drawing the frame outwardly to carry the intermediate transverse portion 21 to the front end of the case to disengage the said intermediate connecting portion from the tray. The intermediate connecting portion, which extends across the top of the egg carrier, has downwardly bent terminals 25, which are secured to the sides 20 of the slidable frame at points intermediate of the ends thereof, and when it is desired to remove the eggs from the carrier, the latter is inverted to permit the eggs to rest upon the tray, and the slidable frame is operated, as before described, to release the tray. The egg carrier is then lifted off the tray leaving the eggs thereon. As the connecting handle portion is located at the front of the case, the egg carrier is adapted to be placed in a horizontal position upon the supporting surface in removing the eggs, and the hand does not have to be placed beneath the tray to effect this result. The outward movement of the slidable frame is limited by stops consisting of staples 26, secured to the side walls 2 adjacent to the front ends thereof and straddling the sides of the slidable frame, as clearly shown in Fig. 1 of the drawing.

Having thus fully described my invention, what I claim as new and desire to secure by Letters Patent, is:—

1. An egg carrier including an egg case, a filler arranged within the case, a slidable locking frame composed of sides located exteriorly of the sides of the case, a handle connecting the sides of the frame and extending across one end of the case and arranged to engage the same to limit the inward movement of the frame, a transverse engaging member connecting the sides of the frame at an intermediate point, and securing means for the frame receiving the sides thereof and arranged in the path of the transverse bar for limiting the outward movement of the frame.

2. An egg carrier including a case provided with opposite guide grooves, a filler arranged within the case, a locking frame composed of sides slidable in the grooves, a transverse engaging member connected with the sides of the frame at points intermediate of the ends thereof, and a front end member also connecting the sides and located below the plane of the upper edges of the case and provided with a bowed portion forming a handle, and staples straddling the sides of the frame and arranged to be engaged by the intermediate transverse member thereof to limit the outward movement of the frame.

In testimony, that I claim the foregoing as my own, I have hereto affixed my signature in the presence of two witnesses.

JOHN LUNKE.

Witnesses:
G. H. KRAVIK,
H. P. NILES.